US007014168B2

(12) United States Patent
Shimura et al.

(10) Patent No.: US 7,014,168 B2

(45) Date of Patent: Mar. 21, 2006

(54) SOLENOID ACTUATOR HAVING MISALIGNMENT ACCOMMODATING STRUCTURE AND SOLENOID VALVE USING THE SAME

(75) Inventors: Yasuhiro Shimura, Kariya (JP); Jiro Kondo, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/919,480

(22) Filed: Aug. 17, 2004

(65) Prior Publication Data

US 2005/0062005 A1 Mar. 24, 2005

(30) Foreign Application Priority Data

Aug. 18, 2003 (JP) ............................. 2003-294385
Jul. 20, 2004 (JP) ............................. 2004-211659

(51) Int. Cl.
*F16K 31/02* (2006.01)

(52) U.S. Cl. ................................. 251/129.15; 335/297

(58) Field of Classification Search ........... 251/129.15; 335/281, 297

See application file for complete search history.

(56) References Cited

U.S. PATENT DOCUMENTS 1,932,164 A * 10/1933 Petit ............................ 335/94
6,486,762 B1 * 11/2002 Kurasawa et al. .......... 335/278
6,811,137 B1 * 11/2004 Hirata et al. ........... 251/129.15

FOREIGN PATENT DOCUMENTS

JP 2000-193120 7/2000
JP 2000-220762 8/2000
JP 2001-187979 7/2001

* cited by examiner

*Primary Examiner*—Edward K. Look
*Assistant Examiner*—John K. Fristoe, Jr.
(74) *Attorney, Agent, or Firm*—Nixon & Vanderhye P.C.

(57) ABSTRACT

A solenoid actuator of a solenoid valve has a solenoid, a yoke, a stator, a cup and a restrained portion. The yoke radially surrounds the stator while radially forming an outer circumferential gap therebetween. The cup receives a plunger. The cup is arranged in the stator while radially forming an inner circumferential gap therebetween. The restrained portion is axially inserted between an internal portion of the yoke and the stator. The outer circumferential gap is greater than the inner circumferential gap. Therefore, even when the inner circumferential gap is set to be small to effectively apply magnetic power generated by the solenoid to the plunger, radial misalignment of the cup can be accommodated by the outer circumferential gap.

8 Claims, 3 Drawing Sheets

SOLENOID ACTUATOR HAVING MISALIGNMENT ACCOMMODATING STRUCTURE AND SOLENOID VALVE USING THE SAME

CROSS REFERENCE TO RELATED APPLICATION

This application is based on and incorporates herein by reference Japanese Patent Applications No. 2003-294385 filed on Aug. 18, 2003 and No. 2004-211659 filed on Jul. 20, 2004.

FIELD OF THE INVENTION

The present invention relates to a solenoid actuator and a solenoid valve. The solenoid valve includes the solenoid actuator having a solenoid to generate magnetic force for actuating a valve body, thereby controlling flow of gas or liquid in fluid channels.

BACKGROUND OF THE INVENTION

A solenoid valve is incorporated into a hydraulic device for performing timing control of a variable valve provided in an internal combustion engine, for example. The solenoid valve is energized to control the fluid channels in the hydraulic device.

As shown in FIG. 4, a solenoid valve 100, which is secured externally to a hydraulic device (not shown), includes a valve body portion 101 and an actuator portion 103. The valve body portion 101 receives a spool 106 serving as a valve body. The actuator portion 103 receives a plunger 102 to actuate the valve body portion 101. The valve body portion 101 is incorporated into the hydraulic device to be communicated with fluid channels (not shown).

The valve body portion 101 includes a cylindrical sleeve 105, the spool 106, and a spring 107. The sleeve 105 has ports 104 to be coupled to the fluid channels in the hydraulic device. The spool 106 serves as the valve body for opening or closing the ports 104 by slidably moving along the inner circumferential portion of the sleeve 105. The spring 107 resiliently urges the spool 106 axially toward the actuator portion 103. The actuator portion 103 includes a solenoid 108, the plunger 102, and a cup 109. The solenoid 108 is energized in accordance with a signal transmitted by an ECU (electronic control unit) to generate magnetic force (attractive force). The plunger 102 receives the magnetic force generated in the solenoid 108, and actuates the spool 106. The cup 109 slidably sustains the plunger 102. Here, a magnetic circuit is formed of the plunger 102, a yoke 110 accommodating the solenoid 108, and a stator 111 provided between the yoke 110 and the plunger 102 to apply the magnetic force to the plunger 102. The yoke 110 and the stator 111 also partially construct the actuator portion 103. The solenoid 108 is energized in response to a signal transmitted from the ECU, and the plunger 102 is slid inside the cup 109. The spool 106 urged by the spring 107 is slid in the sleeve 105 coaxially with the plunger 102. In this manner, the ports 104 are opened or closed to control fluid communication between the fluid channels. An attachment bracket 112 is welded on the outer circumferential face of the yoke 110 to secure the actuator portion 103 on an external portion of the hydraulic device.

As shown in FIG. 5, a solenoid valve 100 has a cup 109 fitting into the inner circumferential face of a stator 111. In this structure, the cup 109 and the stator 111 are apt to be radially misaligned with each other. When radial misalignment between the cup 109 and the stator 111 is not accommodated, magnetic force may be radially applied between the stator 111 and a plunger 102. Accordingly, the cup 109 may deform, and the plunger 102 may not slide smoothly.

Therefore, in this structure, an outer circumferential gap (radial gap) $\alpha$ is formed between the inner circumferential face of the yoke 110 and the outer circumferential face of the stator 111, in order to accommodate radial misalignment of the cup 109. Besides, an inner circumferential gap (radial gap) $\beta$ is formed between the outer circumferential face of the cup 109 and the inner circumferential face of the stator 111.

In general, the outer circumferential gap $\alpha$ is set to be small as much as possible to axially transfer magnetic force between the yoke 110 and the stator 111. Accordingly, the inner circumferential gap $\beta$ is set to be large, so that radial misalignment of the cup 109 is mainly accommodated by the inner circumferential gap $\beta$. However, when the inner circumferential gap $\beta$ is set to be large, a radial gap formed between the stator 111 and the plunger 102 becomes large, and a coil included in the solenoid 108 needs a large number of internal winding to obtain sufficient magnetic performance. Accordingly, the valve actuator 103 is apt to be jumboized.

According to JP-A-2000-193120, a stator 111 and an attachment bracket 112 are integrally formed, so that the stator 111 is directly secured to an external portion of the hydraulic device. However, even when the stator 111 is directly fixed to an external portion of the hydraulic device, radial misalignment of the cup 109 cannot be accommodated.

SUMMARY OF THE INVENTION

In view of the foregoing problem, it is an object of the present invention to provide a solenoid actuator, in which radial misalignment between a stator and a cup can be accommodated even a radial gap formed therebetween is small, and magnetic force generated by a solenoid can be axially transferred efficiently between the stator and the yoke. It is another object of the present invention to provide a solenoid valve including the solenoid actuator.

According to the present invention, a solenoid actuator includes a solenoid, a plunger, a stator, a cylindrical cup, a cylindrical yoke, and a magnetic force transferring member. The solenoid generates a magnetic force. The plunger is substantially coaxially received in the solenoid to receive the magnetic force. The stator has a substantially annular shape defining an inner circumferential face. The cylindrical cup is received in the inner circumferential face of the stator. The cylindrical cup receives the plunger, such that the plunger is substantially axially slidable in the cup. The cylindrical yoke radially surrounds the solenoid and an outer circumference of the stator. The magnetic force transferring member is axially inserted between a step portion formed in an inner circumference of the yoke and the stator to axially transfer magnetic force between the yoke and the stator. The outer circumference of the stator radially forms a first gap with an inner circumferential face of the yoke therebetween. The inner circumferential face of the stator radially forms a second gap with an outer circumferential face of the cup therebetween, The first gap is greater than the second gap. A solenoid valve includes the solenoid actuator and a valve body. The valve body connects to the plunger, such that the valve body is axially actuated by the plunger to open and close a fluid channel. The stator, the yoke and the plunger forms a magnetic circuit to magnetically attract the plunger.

BRIEF DESCRIPTION OF THE DRAWINGS

The above and other objects, features and advantages of the present invention will become more apparent from the following detailed description made with reference to the accompanying drawings. In the drawings.

Figure 1:
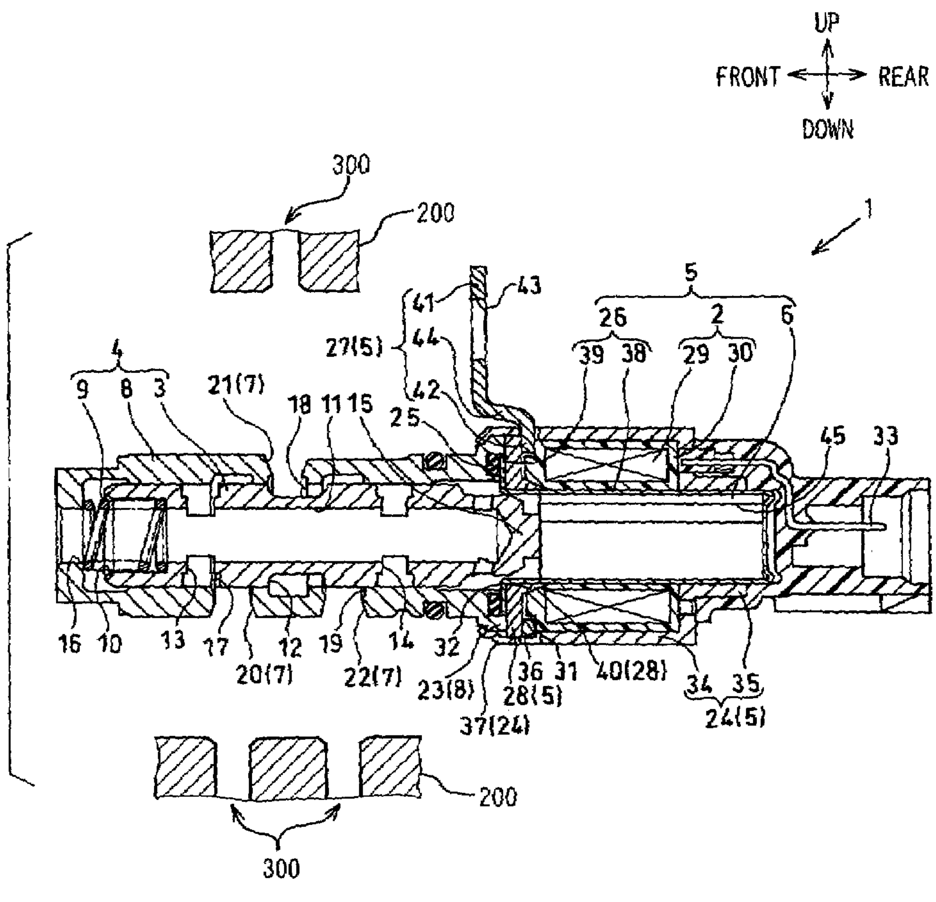
FIG. 1 is a cross-sectional side view showing a solenoid valve according to an embodiment of the present invention.

DETAILED DESCRIPTION OF PREFERRED EMBODIMENTS (First Embodiment)

A solenoid actuator (actuator portion) 5 including a solenoid 2 is provided in a solenoid valve 1. When the solenoid is energized, the solenoid 2 generates magnetic force (attractive force) to actuate a spool 3 serving as a valve body in the solenoid valve 1. The solenoid valve 1 is incorporated into a hydraulic device 200 for providing timing control to a controllable valve of an internal combustion engine (not shown), for example. The solenoid valve 1 is used to control the communication between the fluid channels 300 in the hydraulic device 200.

As shown in FIG. 1, the solenoid valve 1 includes a valve body portion 4 and the actuator portion 5. The valve body portion 4 is inserted into the hydraulic device 200 to communicate with fluid channels 300. The valve body portion 4 accommodates the spool 3 for switching the fluid communication in the fluid channels. The actuator portion 5, which is secured externally to the hydraulic device 200, accommodates a plunger 6 for actuating the spool 3, and the solenoid 2 energized for generating magnetic force (attractive force) to actuate the plunger 6. In the explanations below, the "front" and "rear," and the "up" and "down" will be referred to with respect to the arrangement shown in FIG. 1.

The valve body portion 4 includes a cylindrical sleeve 8, the spool 3, and a spring 9. The cylindrical sleeve 8 has multiple ports 7 to be communicated to the fluid channels. The spool 3 slidably moves along the inner circumferential portion of the sleeve 8 thereby opening or closing the group of ports 7. The spring 9 resiliently biases the spool 3 in a direction, in which the spool 3 is pushed out of the sleeve 8.

The spool 3 is a cylindrical valve body, in which a cylindrical hollow portion 11 with its front end face forming an opening 10 is formed in the major axis direction of the spool 3 (axial direction). The spool 3 has a wide circumferential groove 12 substantially at the outer circumferential face in the axial direction. Furthermore, through-holes 13 and 14, which respectively penetrate the outer circumferential face of the spool 3 vertically toward the hollow portion 11, are formed at the upper and lower positions of the spool 3 with respect to the major axis of the spool 3. The through-holes 13 and 14 are formed at the front and rear positions axially substantially symmetric with respect to the circumferential groove 12. The opening 10 and the spring 9 are coaxially located with respect to the major axis of the spool 3. A contact portion 15 of the spool 3 in contact with the plunger 6 extends backward from the rear end face of the spool 3.

The sleeve 8 is a cylindrical valve housing, which accommodates the spool 3 moving slidably back and forth. The sleeve 8 has an opening 16 at the front end face, which axially faces the opening 10 of the spool 3. Three circumferential grooves 17, 18, and 19 are formed in the inner circumferential face of the sleeve 8. The ports 20, 21, and 22 vertically penetrate the outer circumferential face of the sleeve 8, and communicate to the circumferential grooves 17, 18, and 19, respectively. That is, the ports 20 and 22 penetrating the outer circumferential face of the sleeve 8 from below (down side) respectively communicate to the circumferential grooves 17 and 19, and the port 21 penetrating the outer circumferential face of the sleeve 8 from above (up side) communicate to the circumferential groove 18. The port 20 mainly communicates to the through-hole 13, the port 21 mainly communicates to the circumferential groove 12, and the port 22 mainly communicates to the through-hole 14. The circumferential groove 12 of the spool 3 is wide enough in the axial direction (front to rear), so that the circumferential grooves 17 and 18 or the circumferential grooves 18 and 19 communicate with each other. The sleeve 8 has a flange portion 23 at the rear end portion thereof. The flange portion 23 is greater in diameter than the cylindrical portion of the sleeve 8, in which the ports 20, 21, and 22 are formed. The ports 20, 21, and 22 are connected to a fluid channels 300 which are externally connected to the solenoid valve 1. The flange portion 23 has a shoulder portion on the outer circumferential edge on the front end face of the flange portion 23. The front end portion of a yoke 24 is engageably crimped to the shoulder portion of the flange portion 23. The flange portion 23 has an O-ring 25 on the inner circumference side of the flange portion 23.

The actuator portion 5 includes the solenoid 2, the plunger 6, a cup 26, and an attachment bracket 27. The solenoid 2 is energized to generate magnetic force in accordance with a signal transmitted from an engine control unit (electronic control unit, ECU, not shown). The plunger 6 actuates the spool 3 by the magnetic force generated by the solenoid 2. The cup 26 slidably sustains the plunger 6. The attachment bracket 27 secures the actuator portion 5 externally to the hydraulic device 200. A magnetic circuit created by energizing the solenoid 2 is mainly formed among the plunger 6, the yoke 24 for accommodating the solenoid 2, and a stator 28 for magnetically coupling, i.e., transferring the magnetic force between the yoke 24 and the plunger 6. The yoke 24 and the stator 28 also form part of the actuator portion 5.

The solenoid 2 has a cylindrical body that includes a coil 29 that are wound at predetermined intervals in the axial direction, and a resinous portion (plastic portion) 30, in which the coil 29 is embedded. The outer circumferential face and the rear end face of the solenoid 2 are covered with the cylindrical yoke 24, and the front end face of the solenoid 2 is covered with the stator 28. The outer circumferential face of the stator 28 is also covered with the cylindrical yoke 24. The solenoid 2 has a shoulder portion 31 on the outer circumferential edge of the front end face of the solenoid 2, and a tapered portion 32 on the inner circumferential edge of the solenoid 2 to be reduced in diameter toward the rear side thereof. The coil 29 is connected to the ECU via a connector terminal pin 33.

The yoke 24 is mainly formed of a large diameter portion 34 and a small diameter portion 35. The large diameter portion 34 of the yoke 24 covers the outer circumference of the solenoid 2. The small diameter portion 35 of the yoke 24, which is coupled with the plunger 6 each other, supports the rear end side of the cup 26. Specifically, the small diameter portion 35 of the yoke 24 and the plunger 6 transfers magnetic force with each other. The large diameter portion 34 of the yoke 24 has a step portion 36 on the inner circumference at the front end portion of the large diameter portion 34. Furthermore, the large diameter portion 34 of the yoke 24 has a crimped portion 37 that is engageably crimped to the flange portion 23 of the sleeve 8 at the front portion, i.e., front end portion of the yoke 24. Thus, the valve body portion 4 and the actuator portion 5 are integrated with each other.

The stator 28 is disposed close to the front end of the solenoid 2 to form a magnetic circuit between the yoke 24 and the plunger 6. The stator 28 is a substantially annular flat plate that has a predetermined width in the radial direction thereof. A cylinder portion 38 of the cup 26 is inserted into the inner circumferential portion of the stator 28 from the front side thereof, so that a rear end face of a collar portion 39 contacts the front end face of the stator 28 with each other. A cylindrical core portion 40 protrudes backward, i.e., toward rear side thereof from the inner circumferential edge of the stator 28. The outer circumferential face of the core portion 40 of the stator 28 is tapered to reduce in diameter toward the rear side and fitted into the tapered portion 32 of the solenoid 2. Thus, the stator 28 and the plunger 6 axially transfers magnetic force with each other. This arrangement further ensures that the stator 28 and the plunger 6 are magnetically coupled to each other. A gap is formed in the axial direction between the rear end face of the stator 28 and the front end face of the solenoid 2, thereby accommodating tolerances of the respective components.

Figure 2:
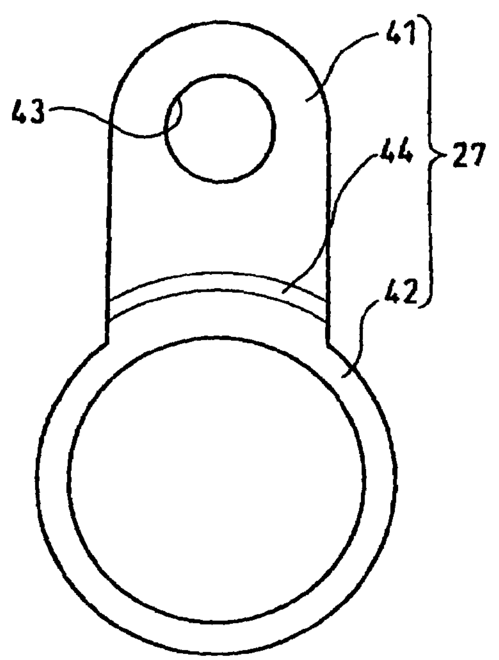
FIG. 2 is a front view of an attachment bracket according to the embodiment of the present invention.

As shown in FIGS. 1 and 2, the attachment bracket 27 includes a fixed portion 41 to be secured to an external predetermined position of the hydraulic device 200, and a restrained portion 42 to be restrained within the yoke 24 of the solenoid valve 1. The restrained portion 42 serves as a magnetic force transferring member. The fixed portion 41 is screwed onto the hydraulic device 200, so that the actuator portion 5 is secured externally to the hydraulic device 200. As shown in FIG. 2, the fixed portion 41, which has a flat plate shape, includes an insertion hole 43 into which a bolt (not shown) or the like is inserted.

The restrained portion 42 is annular in shape with a predetermined width in the radial direction. The restrained portion 42 is fitted over the step portion 36 of the yoke 24, and axially inserted between the step portion 36 of the yoke 24 and the rear end face of a circumferentially, i.e., radially outer portion of the stator 28, so that the restrained portion 42 is restrained in the yoke 24 of the solenoid valve 1. The restrained portion 42 is axially inserted between the step portion 36 of the yoke 24 and the rear end face of the radially outer portion of the stator 28, so that the restrained portion 42 serves as a magnetic force transferring member to transfer magnetic force between the yoke 24 and the stator 28.

The attachment bracket 27 is a separate member from the stator 28, and the front end face of the restrained portion 42 of the attachment bracket 27 contacts the rear end face of the stator 28. With this arrangement, the outer circumferential face of the restrained portion 42 closely contacts the inner circumferential face of the yoke 24, and the inner circumferential face of the restrained portion 42 faces the outer circumferential face of the shoulder portion 31 of the solenoid 2 with a predetermined gap therebetween. The fixed portion 41 and the restrained portion 42 are substantially parallel to each other and connected to each other by means of a coupling portion 44. As shown in FIG. 1, the attachment bracket 27 is assembled to the solenoid valve 1, so that the fixed portion 41 of the attachment bracket 27 is positioned at the front side compared with the restrained portion 42.

The plunger 6 has a pillar-shaped body, which contacts the contact portion 15 of the spool 3, and coaxially arranged with the center axis of the solenoid 2 to receive magnetic forces, thereby axially actuating the spool 3. The center axis of the solenoid 2 is coaxial with respect to the major axis of the spool 3. The plunger 6 has an air vent hole 45 that penetrates in the axial direction, allowing air or liquid to enter to or exit from the rear end portion of the cup 26 as the plunger 6 moves.

The cup 26 has the cylinder portion 38 that is coaxially arranged in the inner circumference of the solenoid 2, and the collar portion 39 that radially extends outwardly from the outer circumference of front end side of the cylinder portion 38. The cylinder portion 38 is closed, i.e., bottomed at its rear end, and opened at its front end, thereby allowing the rear end portion of the spool 3 to move freely back and forth therethrough. The cylinder portion 38 retains the plunger 6, such that the plunger 6 can move back and forth in the cylinder portion 38. That is, the outer circumferential face of the plunger 6 slides back and forth with respect to the inner circumferential face of the cylinder portion 38. The cup 26 prevents the plunger 6 from backwardly protruding out of the cylinder portion 38 of the cup 26 due to hydraulic pressure. That is, the rear end face of the plunger 6 contacts the rear bottomed end of the cylinder portion 38 of the cup 26, thereby preventing the plunger 6 from backwardly dropping off. The collar portion 39 is disposed closer to the front side inside the yoke 24 of the solenoid valve 1 than the restrained portion 42 of the attachment bracket 27, and sandwiched between the O-ring 25 and the front end face of the stator 28. That is, the collar portion 39 is disposed on an axially opposite side as the solenoid 2 with respect to the restrained portion 42.

Figure 3:
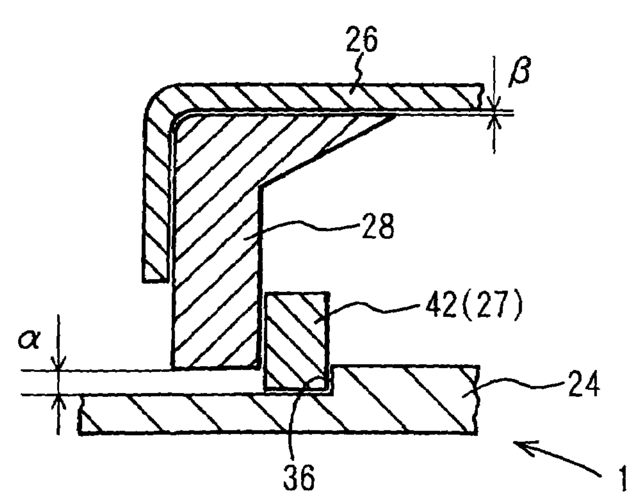
FIG. 3 is a cross-sectional view showing radial gaps between a cup, stator and a yoke according to the embodiment.
Figure 4:
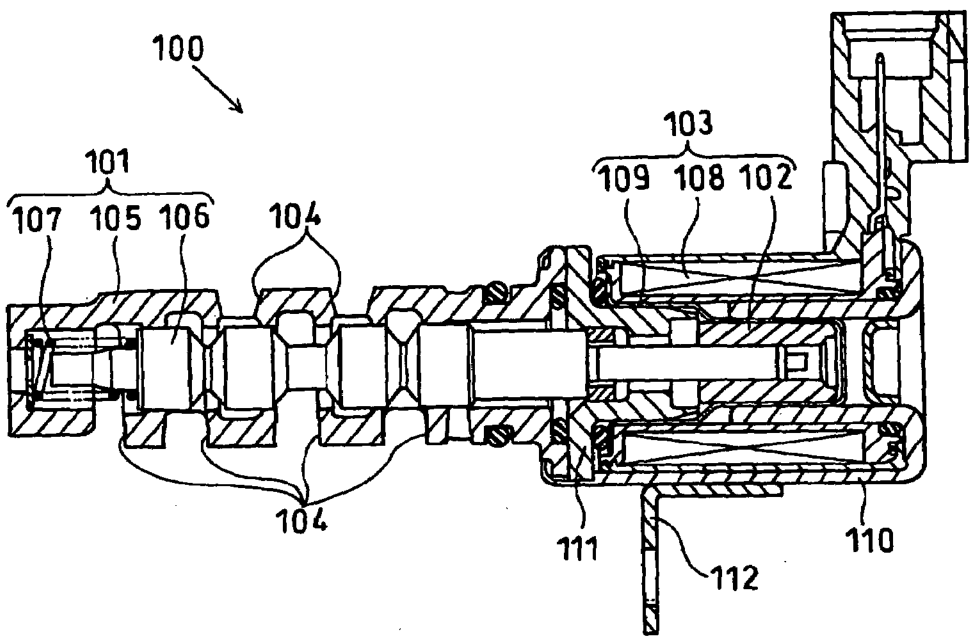
FIG. 4 is a cross-sectional side view showing a solenoid valve according to a prior art.
Figure 5:
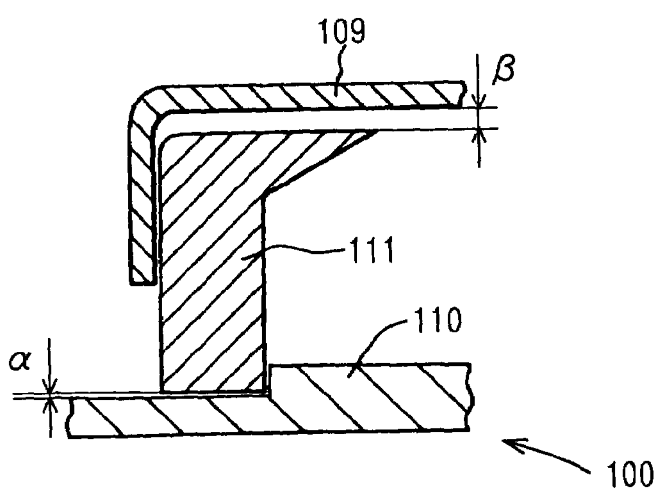
FIG. 5 is a cross-sectional view showing radial gaps between a cup, stator and a yoke according to a related art.

As shown in FIG. 3, with the solenoid valve 1, an outer circumferential gap $\alpha$ is radially formed between the inner circumferential face of the yoke 24 and the outer circumferential face of the stator 28. Besides, an inner circumferential gap $\beta$ is radially formed between the outer circumferential face of the cylinder portion 38 of the cup 26 and the inner circumferential face of the stator 28. The outer circumferential gap $\alpha$ is greater than the inner circumferential gap $\beta$.

(Operation of First Embodiment)

The operation of the solenoid valve 1 is explained as below. First, the coil 29 of the solenoid 2 is energized in response to a signal from the ECU, so that magnetic force is generated to actuate the plunger 6. The plunger 6 slides inside the cylinder portion 38 of the cup 26, so that the spool 3 in contact with the plunger 6 is actuated to axially slide in the sleeve 8. The coil 29 is energized, and magnetic force is generated by the coil 29, so that the plunger 6 moves frontward. This results in the spool 3 being actuated to move frontward against the resilient force of the spring 9. Conversely, when electric power applied to the coil 29 decreases, magnetic force generated by the coil 29 becomes small, so that the spool 3 urged by the spring 9 moves backwardly, and the plunger 6 in contact with the spool 3 moves backwardly. In this manner, each port of the valve body portion 4 opens or closes, so that communication in the fluid channels connected to each ports is controlled.

(Features and Effects of First Embodiment)

In this embodiment, with the solenoid valve 1, the restrained portion 42 of the attachment bracket 27 is axially inserted between the step portion 36 formed in the inner circumferential face of the yoke 24 and the circumferentially, i.e., radially outer portion of the stator 28, so that the restrained portion 42 serves as the magnetic force transferring member to axially transfer magnetic force between the yoke 24 and the stator 28. The cup 26 fits into the inner circumferential face of the stator 28 from the front side, and the outer circumferential gap (first gap) $\alpha$ is set to be greater than the inner circumferential gap (second gap) $\beta$. Therefore, even when the inner circumferential gap $\beta$ is set to be small, radial misalignment of the cup 26 can be accommodated by the outer circumferential gap $\alpha$. The restrained portion 42 serves as the magnetic force transferring member, so that the yoke 24 and the stator 28 can axially transfer magnetic force with each other, efficiently. As a result, even when the inner circumferential gap $\beta$ is set to be small to reduce the radial gap between the solenoid 2 and the plunger 6, radial misalignment of the cup 26 can be accommodated by the outer circumferential gap $\alpha$, and the yoke 24 and the stator 28 can axially transfer magnetic force with each other, efficiently. Therefore, the radial gap between the solenoid 2 and the plunger 6 can be reduced, so that an internal winding number of the coil 29 of the solenoid 1 can be reduced, thereby downsizing the actuator portion 5. Furthermore, radial misalignment of the cup 26 can be accommodated by the outer circumferential gap $\alpha$, so that the cup 26 can be restricted from deformation, and the plunger 6 can be operated smoothly.

The step portion 36 of the yoke 24 and the restrained portion 42 of the attachment bracket 27 contact plane to plane with each other, and the restrained portion 42 of the attachment bracket 27 and the stator 28 also contact plane to plane with each other. Therefore, components, such as the yoke 24, the attachment bracket 27 and the stator 28 can steadily connected with each other, and arrangement of the components can be easily maintained, so that magnetic force can be axially transferred in the magnetic circuit, steadily.

The attachment bracket 27 includes the fixed portion 41 to be secured externally to the hydraulic device 200, and the restrained portion 42 to be restrained within the yoke 24 of the solenoid valve 1. Furthermore, the cup 26 includes the collar portion 39 that radially extends outwardly from the outer circumference of the front end portion of the cylinder portion 38 that slidably sustains the plunger 6. The collar portion 39 is disposed closer to the front side than the restrained portion 42 inside the solenoid valve 1.

This arrangement ensures that the liquid pressure acting from the front side of the spool 3 and the plunger 6 is conveyed to the fixed portion 41 via the collar portion 39 and the restrained portion 42. Therefore, the solenoid valve 1 is secured to the hydraulic device 200, and prevented from dropping off the hydraulic device 200. This effect is particularly effective when the liquid pressure directly acts axially to the solenoid valve 1 through the opening 16 of the sleeve 8 and the opening 10 of the spool 3.

The stator 28 is separated from the attachment bracket 27, so that the stator 28 can used independently of the attachment bracket 27. Therefore, the stator 28 can be commonly used among different types of solenoid valves, thereby improving productivity.

MODIFIED EXAMPLE

In the above embodiment, the actuator portion 5 having the above structure is not limited to the use of a solenoid valve. The actuator portion 5 can be applied to any other solenoid actuator used for an actuating device, such as a positioning actuator, a lock device, a relay device, a pumping apparatus, for example.

In the above embodiment, the solenoid valve 1 is incorporated into a hydraulic device 200 that provides timing control to a controllable valve in an internal combustion engine. However, the solenoid valve 1 can be also incorporated into a hydraulic device that controllably actuates a multi-plate clutch or multi-plate brake in an automatic transmission, for example.

In the above embodiment, the collar portion 39 of the cup 26, the stator 28, and the restrained portion 42 of the attachment bracket 27 are disposed from front side to rear side. However, the arrangement can be modified so long as the collar portion 39 is placed on the front side than the restrained portion 42. For example, the stator 28, the collar portion 39, and the restrained portion 42 may be disposed from the front side to rear side in that order.

The spool 3 and the plunger 6 can be formed in one piece, and another shaft member can be additionally provided between the spool 3 and the plunger 6.

The restrained portion 42 serving as the magnetic force transferring member can be a separate member separated from the attachment bracket 27.

Various modifications and alternations may be made to the above embodiments without departing from the spirit of the present invention.

What is claimed is:

1. A solenoid actuator comprising:

a solenoid;

a plunger that is arranged substantially coaxially with respect to the solenoid;

a stator that has a substantially annular shape defining an inner circumferential face;

a cylindrical cup that is arranged radially inside of the inner circumferential face of the stator, the cup receiving the plunger such that the plunger is substantially axially slidable in the cup;

a cylindrical yoke that radially surrounds the solenoid and an outer circumference of the stator; and a magnetic force transferring member that is axially inserted between a step portion formed in an inner circumference of the yoke and a radially outer portion of the stator to axially transfer magnetic force between the yoke and the stator, wherein the outer circumference of the stator radially forms a first gap with an inner circumferential face of the yoke therebetween, the inner circumferential face of the stator radially forms a second gap with an outer circumferential face of the cup therebetween, and the first gap is greater than the second gap.

2. The solenoid actuator according to claim 1, further comprising a bracket that includes:

a restrained portion that is restrained in the yoke to serve as the magnetic force transferring member; and a fixed portion that externally secures the yoke, wherein the cup includes a collar portion that radially extends outwardly from an outer circumference of the cup, and the collar portion is disposed on an axially opposite side as the solenoid with respect to the restrained portion.

3. The solenoid actuator according to claim 2, wherein the stator is separated from the bracket.

4. The solenoid actuator according to claim 1, wherein the stator, the yoke and the plunger form a magnetic circuit to magnetically attract the plunger.

5. A solenoid valve comprising:

a solenoid actuator including, a solenoid, a plunger that is arranged substantially coaxially with respect to the solenoid, a stator that has a substantially annular shape defining an inner circumferential face, a cylindrical cup that is arranged radially inside of the inner circumferential face of the stator, the cup receiving the plunger such that the plunger is substantially axially slidable in the cup, a cylindrical yoke that radially surrounds the solenoid and an outer circumference of the stator, and a magnetic force transferring member that is axially inserted between a step portion formed in an inner circumference of the yoke and a radially outer portion of the stator to axially transfer magnetic force between the yoke and the stator; and a valve body that connects to the plunger, such that the valve body is axially actuated by the plunger to open and close a fluid channel, wherein the outer circumference of the stator radially forms a first gap with an inner circumferential face of the yoke therebetween, the inner circumferential face of the stator radially forms a second gap with an outer circumferential face of the cup therebetween, and the first gap is greater than the second gap.

6. The solenoid valve according to claim 5, wherein the solenoid actuator further includes a bracket that includes:

a restrained portion that is restrained in the yoke to serve as the magnetic force transferring member; and a fixed portion that externally secures the yoke, the cup includes a collar portion that radially extends outwardly from an outer circumference of the cup, and the collar portion is disposed on a side of the valve body axially with respect to the restrained portion.

7. The solenoid valve according to claim 6, wherein the stator is separated from the bracket.

8. The solenoid valve according to claim 5, wherein the stator, the yoke and the plunger form a magnetic circuit to magnetically attract the plunger.

* * * * *